United States Patent
Nam et al.

(10) Patent No.: US 10,732,760 B2
(45) Date of Patent: Aug. 4, 2020

(54) VEHICLE AND METHOD FOR CONTROLLING THE VEHICLE

(71) Applicant: HYUNDAI MOTOR COMPANY, Seoul (KR)

(72) Inventors: Jong Yong Nam, Seongnam-si (KR); Inseong Park, Incheon (KR); Yong Lee, Suwon-si (KR); Gi Beom Hong, Bucheon-si (KR); Seok-Young Youn, Seoul (KR); Jia Lee, Uiwang-si (KR); Taeyub Kim, Hwaseong-si (KR); Hotaek Lee, Seoul (KR)

(73) Assignee: Hyundai Motor Company, Seoul (KR)

(*) Notice: Subject to any disclaimer, the term of this patent is extended or adjusted under 35 U.S.C. 154(b) by 208 days.

(21) Appl. No.: 15/374,767

(22) Filed: Dec. 9, 2016

(65) Prior Publication Data
US 2017/0269771 A1 Sep. 21, 2017

(30) Foreign Application Priority Data
Mar. 21, 2016 (KR) .......................... 10-2016-0033188

(51) Int. Cl.
| | |
|---|---|
| *G06F 3/041* | (2006.01) |
| *B60K 35/00* | (2006.01) |
| *G06F 3/0488* | (2013.01) |
| *G06K 9/00* | (2006.01) |
| *B60K 37/06* | (2006.01) |

(52) U.S. Cl.
CPC .......... *G06F 3/0416* (2013.01); *B60K 35/00* (2013.01); *B60K 37/06* (2013.01); *G06F 3/04883* (2013.01); *G06F 3/04886* (2013.01); *G06K 9/00832* (2013.01); *B60K 2370/146* (2019.05); *B60K 2370/1438* (2019.05); *B60K 2370/1442* (2019.05); *B60K 2370/73* (2019.05); *B60K 2370/736* (2019.05); *B60K 2370/739* (2019.05); *B60K 2370/741* (2019.05); *B60K 2370/774* (2019.05)

(58) Field of Classification Search
None
See application file for complete search history.

(56) References Cited

U.S. PATENT DOCUMENTS

| | | | | |
|---|---|---|---|---|
| 2002/0067366 A1* | 6/2002 | Hirao | ..................... | B60K 35/00 345/660 |
| 2012/0053794 A1* | 3/2012 | Alcazar | ................ | B60N 2/0244 701/48 |
| 2013/0009761 A1* | 1/2013 | Horseman | ............. | B60W 40/08 340/425.5 |

(Continued)

FOREIGN PATENT DOCUMENTS

| | | | | |
|---|---|---|---|---|
| DE | 102008048825 A1 * | 3/2010 | ............. | B60K 35/00 |
| JP | 2011-081798 A | 4/2011 | | |

(Continued)

*Primary Examiner* — Benjamin C Lee
*Assistant Examiner* — Krishna P Neupane
(74) *Attorney, Agent, or Firm* — Morgan, Lewis & Bockius LLP

(57) ABSTRACT

A vehicle includes a display for displaying a keypad to receive a command through a touch gesture of a user, and a controller for determining an operable area for the user on the display based on a user's shoulder height and arm length, and for controlling the display to display the keypad in the operable area.

14 Claims, 8 Drawing Sheets

(56) References Cited

U.S. PATENT DOCUMENTS

| | | | | |
|---|---|---|---|---|
| 2013/0181897 | A1* | 7/2013 | Izumi | G06F 3/017 |
| | | | | 345/156 |
| 2015/0312182 | A1* | 10/2015 | Langholz | H04L 51/04 |
| | | | | 715/753 |
| 2015/0331569 | A1* | 11/2015 | Kang | G06F 1/1684 |
| | | | | 715/765 |
| 2017/0249718 | A1* | 8/2017 | Wunderlich | B60W 50/10 |

FOREIGN PATENT DOCUMENTS

| | | |
|---|---|---|
| JP | 2013-514237 A | 4/2013 |
| KR | 20100106195 A | 10/2010 |
| KR | 20110076921 A | 7/2011 |
| KR | 10-2011-0117966 A | 10/2011 |
| KR | 10-2012-0065675 A | 6/2012 |
| KR | 10-2013-0071253 A | 6/2013 |
| KR | 20150078453 A | 7/2015 |

\* cited by examiner

VEHICLE AND METHOD FOR CONTROLLING THE VEHICLE

CROSS-REFERENCE TO RELATED APPLICATION

This application claims the benefit of priority to Korean Patent Application No. 10-2016-0033188, filed on Mar. 21, 2016, with the Korean Intellectual Property Office, the disclosure of which is incorporated herein by reference in its entirety.

TECHNICAL FIELD

The present disclosure relates to vehicles, and more particularly, to user input technologies within vehicles.

BACKGROUND

Touch-based inputting technologies have been developed and applied to displays equipped in vehicles. For example, a driver may touch a keypad displayed on the vehicle's display to enter a desired command into the vehicle.

However, in order to enter a command by touching the display device while driving, the driver may need to move his/her body for his/her hand to reach the display device. Moving the driver's body while driving may create an adverse driving situation. Thus, there is an unmet need for an improved user input technology in vehicles.

SUMMARY

Embodiments of the present disclosure provide a vehicle and method for controlling the same, whereby using physical information of a user to determine an operable area to display a keypad on a display or determine an operable area including a point touched by the driver, thereby displaying the keypad in the determined operable area.

In accordance with some aspects of the present disclosure, a vehicle comprises: a display for displaying a keypad to receive a command through a touch gesture of a user; and a controller for determining an operable area for the user on the display based on the user's shoulder height and arm length, and for controlling the display to display the keypad in the operable area.

The vehicle may further comprise: a camera; and an operation recognizer for recognizing at least one joint position of the user using an image of the user captured by the camera.

The controller may be configured to calculate a reference point to be a reference to obtain physical information of the user based on information about an extent of shift of a seat of the vehicle, and calculate the physical information using the reference point and the at least one joint position of the user obtained by the operation recognizer including the user's shoulder height, upper-arm length, lower-arm length, and hand length.

The controller may be configured to determine a sphere having a radius centered on the user's shoulder, the radius corresponding to a sum of the user's upper-arm length, lower-arm length, and hand length, and to determine the operable area based on an overlapping area between the sphere and the display.

The controller may be configured to determine the operable area including a touched point if the user touches the display.

The controller may be configured to display a message on the display asking the user to touch the display before the keypad is displayed.

In accordance with some aspects of the present disclosure, a vehicle comprises: a display for displaying a keypad to receive a command through a touch gesture of a user; and a controller for calculating an operable area including a touched point if the user touches the display, and for controlling the display to display the keypad in the operable area.

The controller may be configured to display a message on the display asking the user to touch the display before the keypad is displayed.

The controller may be configured to calculate an operable area for the user on the display based on the user's shoulder height and arm length, and to control the display to display the keypad in the operable area.

The vehicle further may comprise: a camera; and an operation recognizer for recognizing at least one joint position of the user using an image of the user captured by the camera.

The controller may be configured to calculate a reference point to be a reference to obtain physical information of the user based on information about an extent of a shift of a seat of the vehicle, and calculate the physical information using the reference point and the at least one joint position of the user obtained by the operation recognizer including the user's shoulder height, upper-arm length, lower-arm length, and hand length.

The controller may be configured to determine a sphere having a radius centered on the user's shoulder, the radius corresponding to a sum of the user's upper-arm length, lower-arm length, and hand length, and to calculate the operable area based on an overlapping area between the sphere and the display.

In accordance with some aspects of the present disclosure, a method for controlling a vehicle, the method comprising: determining an operable area for a user on a display of the vehicle based on the user's shoulder height and arm length; and displaying a keypad for receiving a command through a touch gesture of the user in the operable area on the display.

The method may further comprise: calculating a reference point to be a reference to obtain physical information of the user based on information about an extent of shift of a seat of the vehicle; and calculating the physical information using the reference point and at least one joint position of the user obtained by an operation recognizer of the vehicle, including the user's shoulder height, upper-arm length, lower-arm length, and hand length.

The step of determining an operable area for a user on a display of the vehicle based on the user's shoulder height and arm length may comprise: determining a sphere having a radius centered on the user's shoulder, the radius corresponding to a sum of the user's upper-arm length, lower-arm length, and hand length; and determining the operable area based on an overlapping area between the sphere and the display.

The method further may comprise: determining the operable area to include a touched point if the user touches the display.

The method may further comprise: displaying a message on the display asking the user to touch the display before the keypad is displayed.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Embodiments of the present disclosure will be described in detail with reference to accompanying drawings.

Figure 1:
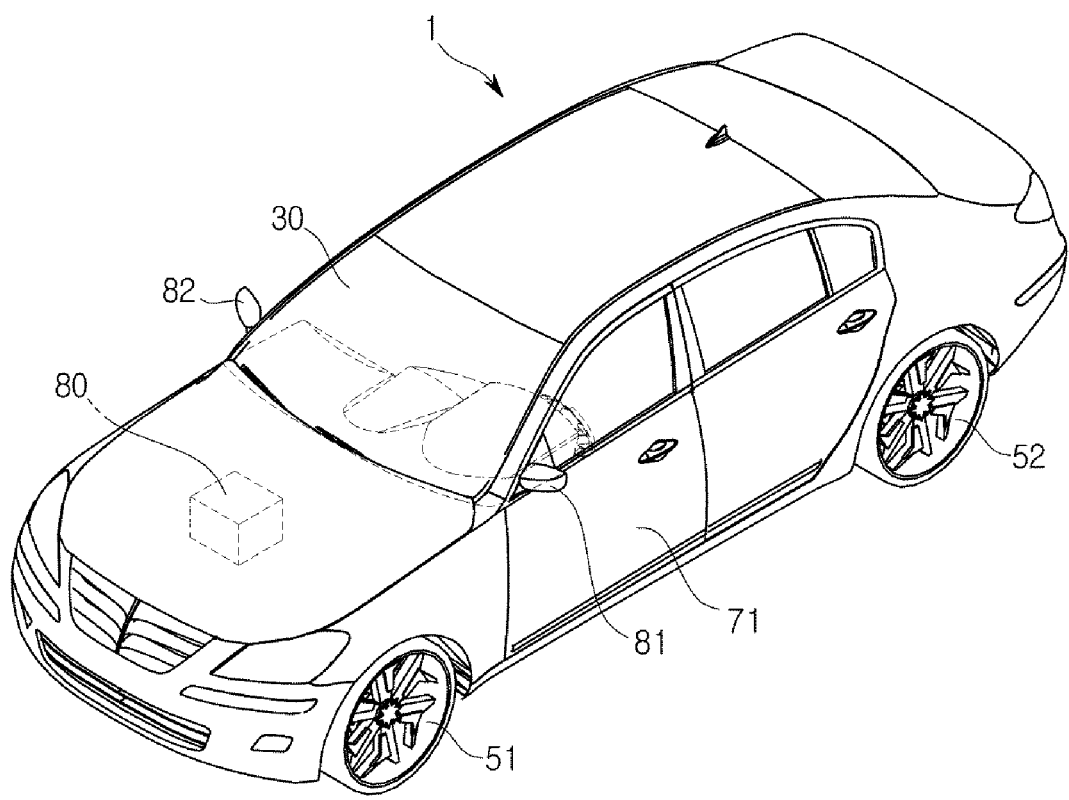
FIG. 1 illustrates external features of a vehicle, according to exemplary embodiments of the present disclosure.
Figure 2:
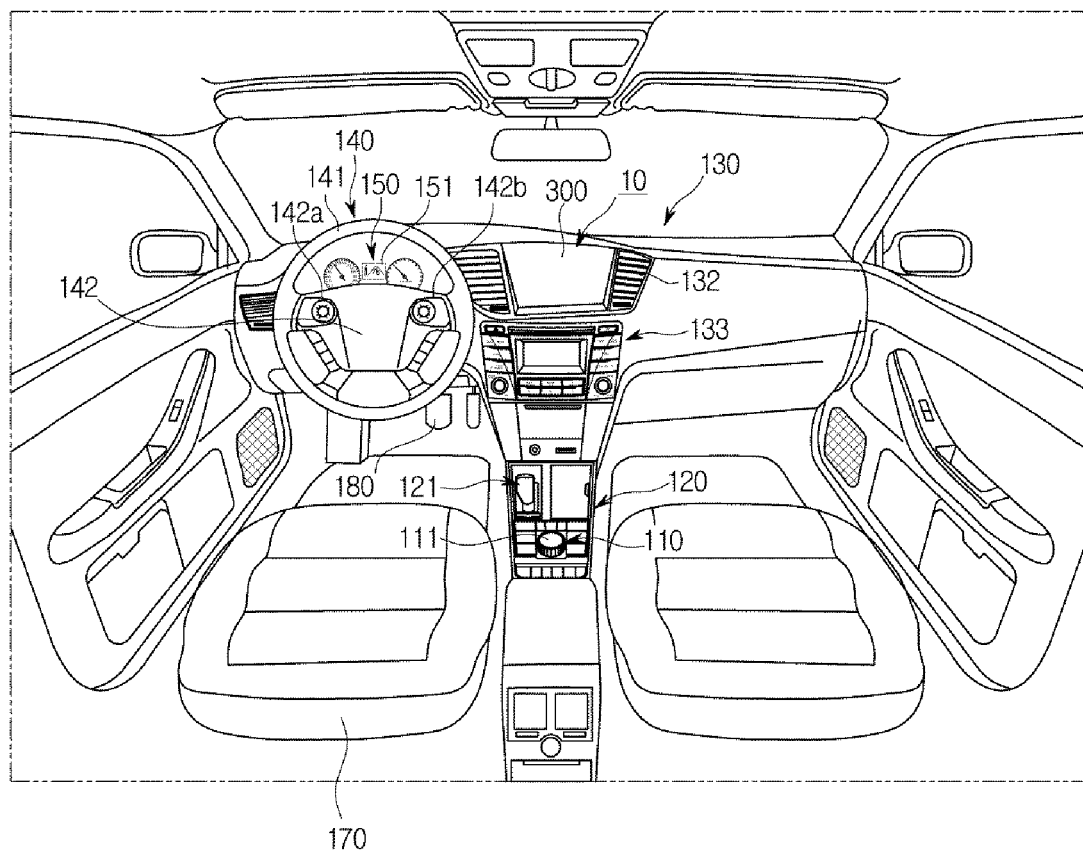
FIG. 2 illustrates internal features of a vehicle, according to exemplary embodiments of the present disclosure.

FIG. 1 is an exterior view of a vehicle, according to exemplary embodiments of the present disclosure, and FIG. 2 illustrates internal features of a vehicle, according to exemplary embodiments of the present disclosure.

Referring to FIG. 1, a vehicle includes a main body 1 that constitutes the exterior of the vehicle, wheels 51 and 52 for moving the vehicle, a driving system 80 for rotating the wheels 51 and 52, doors 71 for shielding the interior of the vehicle from the outside, a front window 30 through which the driver can see a view ahead of the vehicle and side mirrors 81 and 82 for helping the driver see areas behind and to the sides of the vehicle.

The wheels 51 and 52 include front wheels 51 disposed on the front side of the vehicle and rear wheels 52 disposed on the rear side of the vehicle.

The driving system 80 provides torque to the front and/or rear wheels 51 or 52 to move the main body 1 forward or backward. The driving system 60 may include a motor that produces the torque from electrical power supplied from a charging battery (not shown) or a combustion engine (not shown) that burns a fuel to create the turning force.

The doors 71 are attached onto the left and right sides of the main body 1, and are opened for entering and exiting the vehicle and closed for shielding the interior of the vehicle from the outside.

The front window 30, also referred to as a windshield glass, is equipped on the upper front of the main body 100. The driver of the vehicle may see a view ahead of the vehicle through the front window 30.

The side mirrors 81, 82 include left and right side mirrors 81 and 82 equipped on the left and right sides of the main body 1. The driver of the vehicle may check the situations behind the main body 100 or on the sides of the vehicle with his or her eyes via side mirrors 81, 82.

In addition, the vehicle may include various sensors to detect obstacles around the vehicle and help the driver recognize situations around the vehicle. For example, the vehicle may include a number of cameras to capture images ahead, behind, and to the left and right.

The vehicle may include a dashboard equipped with a gear box 120, a center fascia 130, a steering wheel 140 and an instrument panel 150, as shown in FIG. 2.

The gear box 120 includes a gear 121 for gear shifting. As shown in FIG. 2, there a dial 111 and an input unit 110 having various buttons enabling the user to control functions of a multimedia system including a navigation system 10 or an audio system 133, or major functions of the vehicle, is included in the vehicle interior.

In the center fascia 130, an air conditioning (AC) system, the audio system 133, the navigation system 10 etc., may be installed.

The AC system keeps the atmosphere inside the vehicle pleasant by controlling temperature, humidity, air cleanness, and air flows inside the vehicle. The AC system may include at least one vent 132 installed in the center fascia 130 for venting air. There may also be buttons or dials installed in the center fascia 130 to control, for example, the AC system. The driver or the user may control the AC system of the vehicle by manipulating the buttons or a dial arranged on the center fascia 130. The AC system may also be controlled by the dial 111 or buttons of the input unit 110 installed on the gear box 120.

In some embodiments, the navigation system 10 may be installed in the center fascia 130. The navigation system 10 may also be built into the center fascia 130 of the vehicle. In an embodiment, an input unit to control the navigation system 10 may be installed in the center fascia 130. In an embodiment, the input unit of the navigation system 10 may be installed elsewhere than in the center fascia 130. For example, the input unit for the navigation system 10 may be formed around a display 300 of the navigation system 10. In another example, the input unit of the navigation system 10 may be installed in the gear box 120.

The steering wheel 140 is a device used to control a traveling direction of the vehicle, and may include a rim 141 held by the driver and a spoke 142 connected to a steering system of the vehicle for connecting the rim 141 to a hub of a rotation shaft for steering the vehicle. In an embodiment, control devices 142a, 142b may be formed on the spoke 142 to control various devices in the vehicle, e.g., the audio system. The steering wheel 140 may also have a function to call the driver's attention to safe driving. For example, the steering wheel 140 may vibrate and warn the driver about drowsy driving if the driver is dozing off behind the wheel, and may also warn the driver about a danger through vibrations if there are risks of traffic accidents due to a change in driving conditions.

Furthermore, the dashboard may include various instrument panels 150 to indicate speed, engine revolutions per minute (rpm), an amount of fuel remaining, etc., of the vehicle. The instrument panel 150 may include an instrument panel display 151 for displaying information regarding vehicle conditions, information regarding driving of the vehicle and information relating to manipulation of the multimedia system, etc.

The display 300 of the navigation system may receive touch-based commands (or touch commands) from the user, and perform a function according to the touch command There may be an occasion when it is not easy to touch an interface, e.g., the key pad displayed on the display 300 due to the driver's physical condition, size or orientation. Accordingly, an embodiment of the present disclosure provides a vehicle and method for controlling the vehicle to display an interface in an easy-to-touch area depending on the driver's physical condition. This will be described in detail in connection with FIGS. 3 to 7.

Figure 3:
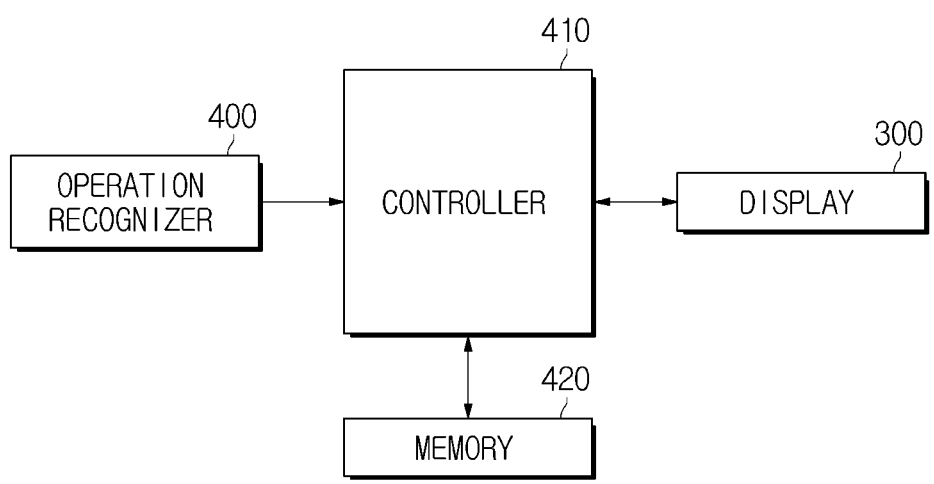
FIG. 3 is a control block diagram of a vehicle, according to exemplary embodiments of the present disclosure.
Figure 4:
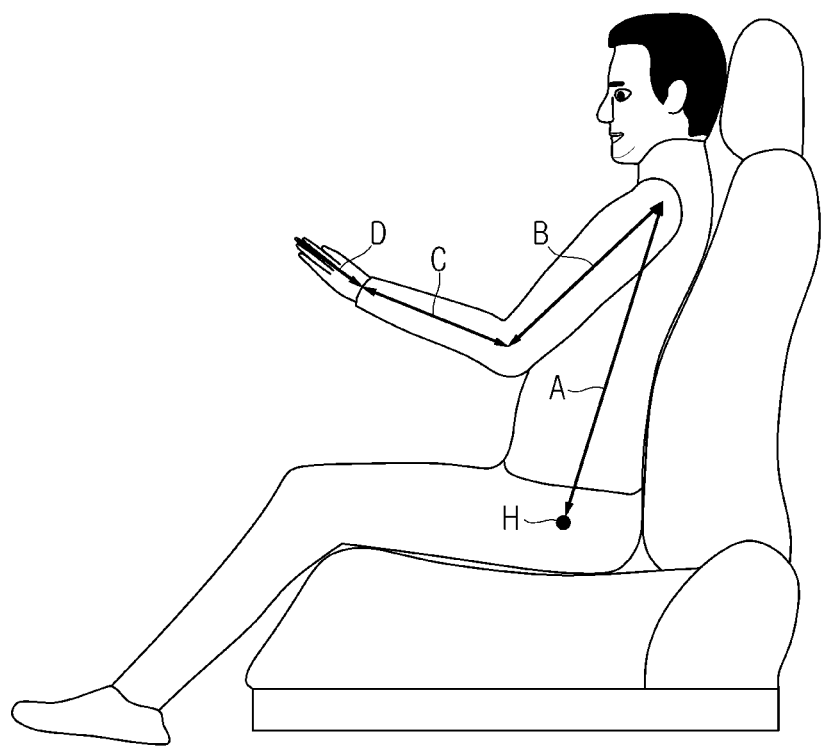
FIG. 4 illustrates elements related to an acquisition of physical information of a user, which is performed by an operation recognizer in a vehicle, according to exemplary embodiments of the present disclosure.
Figure 5:
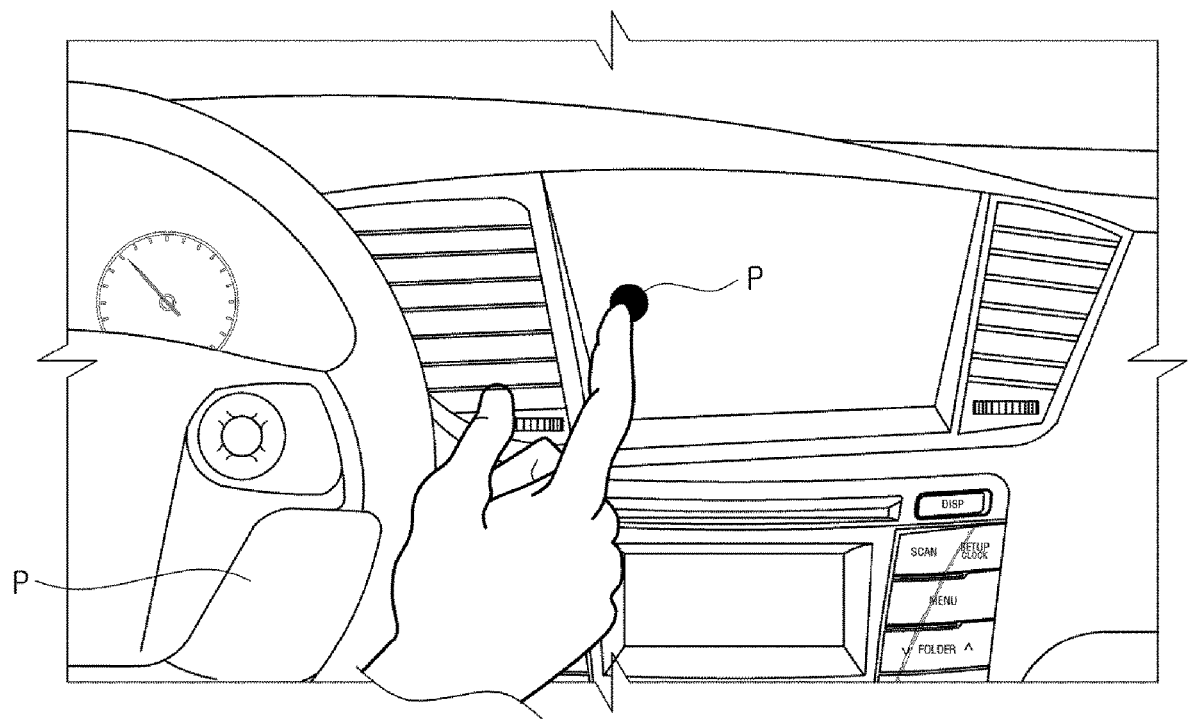
FIG. 5 illustrates a touch gesture made by a user to set an operable area on a display of a vehicle, according to exemplary embodiments of the present disclosure.
Figure 6:
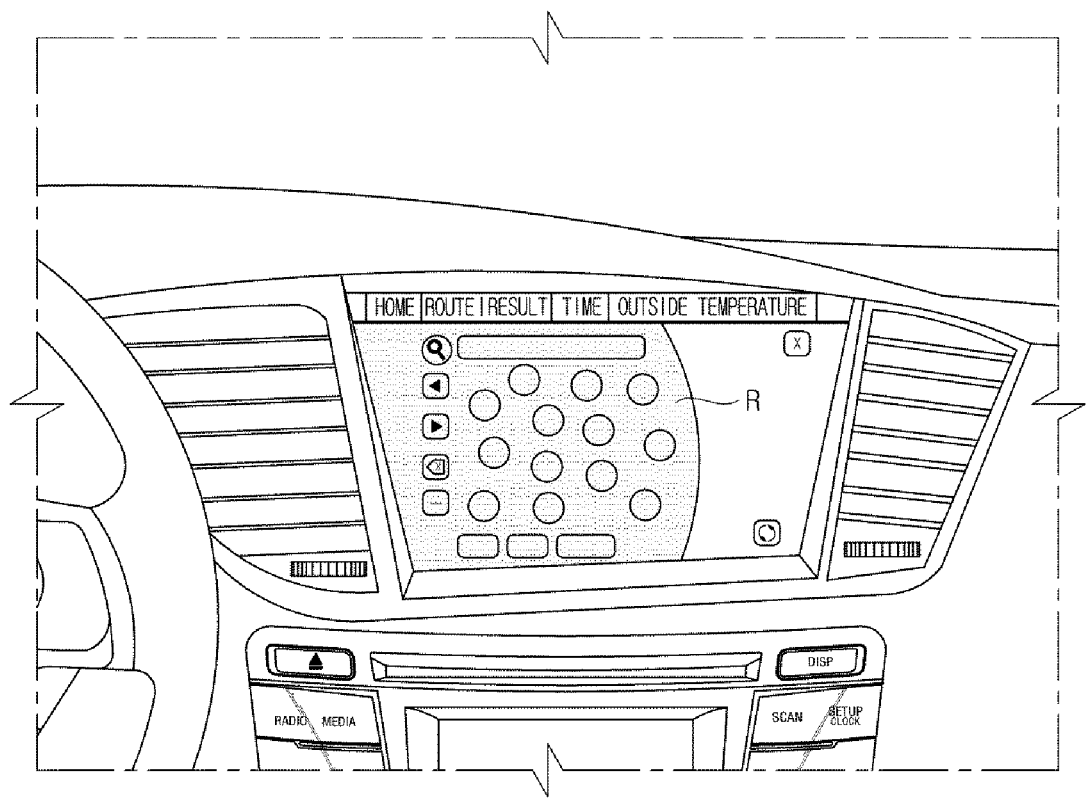
FIGS. 6 and 7 illustrate a keypad displayed in an operable area on a display of a vehicle, according to exemplary embodiments of the present disclosure.
Figure 7:
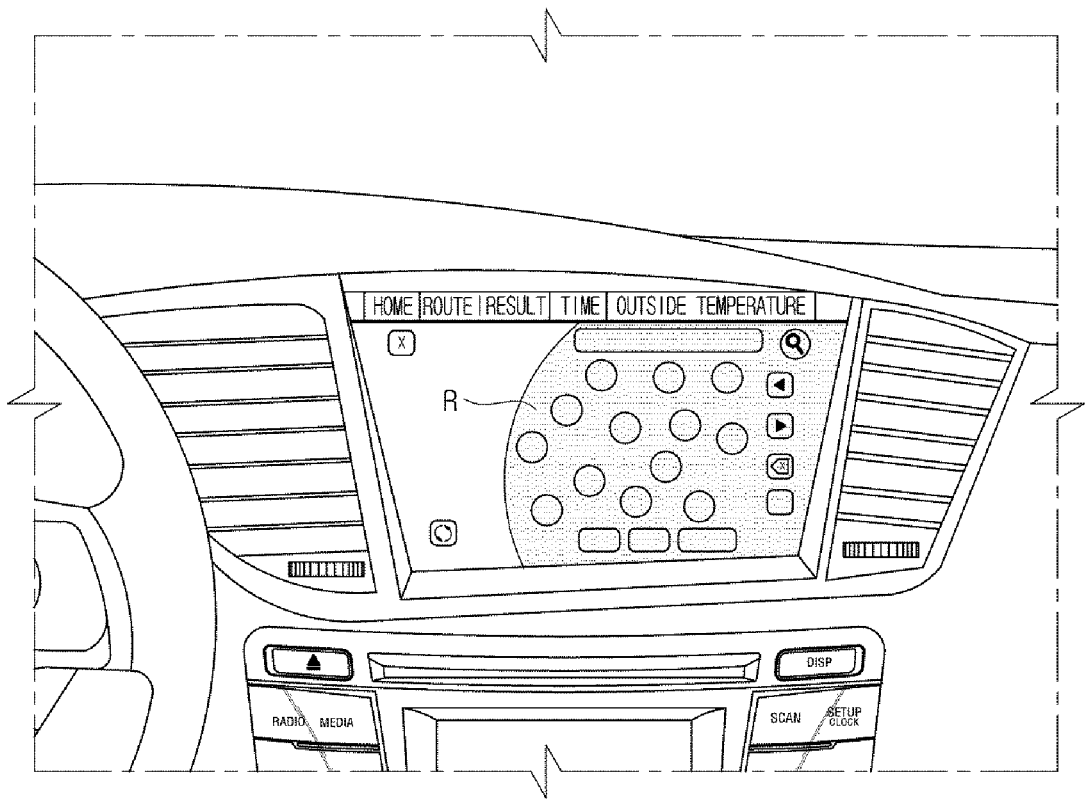

FIG. 3 is a control block diagram of a vehicle, according to exemplary embodiments of the present disclosure, and FIG. 4 illustrates elements and/or steps pertaining to an acquisition of physical information of a user, which is performed by an operation recognizer 400 in a vehicle, according to exemplary embodiments of the present disclosure. FIG. 5 illustrates a touch made by a user to set an operable area on a display 300 of a vehicle, according to exemplary embodiments of the present disclosure, and FIGS. 6 and 7 illustrate a keypad displayed in an operable area on the display 300 of the vehicle, according to exemplary embodiments of the present disclosure.

Referring to FIG. 3, a vehicle in accordance with an embodiment of the present disclosure may include an operation recognizer 400 for recognizing a movement of the user, i.e., the driver or passenger in the vehicle to obtain the user's physical information including joint positions of the user, a display 300 for receiving a touch command from the user, and a controller 410 for determining an operable area on the display 300 based on the user's physical information obtained by the operation recognizer 400 or on a touch gesture on the display 300 and displaying a keypad in the operable area.

The operation recognizer 400 may include a camera for capturing an image of the driver. There is no limitation on a location for installing the camera or how many cameras there are, as long as the one or more cameras are able to capture an image of the user. The camera may include a charge coupled device (CCD) or a complementary metal-oxide semiconductor (CMOS). The operation recognizer 400 may obtain physical information required to determine an operable area from the image of the driver captured by the camera, as shown in FIG. 4. Specifically, the operation recognizer 400 may obtain information about points corresponding to the driver's shoulders, elbow, wrists and/or finger tips. Such physical information may be sent to the controller 410 and used by the controller 410 to determine an operable area.

The display 300 may be located in the center fascia 130, or the center area of the dashboard. The display 300 may employ self-radiating Light Emitting Diodes (LEDs) or Organic Light Emitting Diodes (OLEDs), a Liquid Crystal Display (LCD) equipped with an extra light source, or the like. Furthermore, the display 300 may include a touch screen panel (TSP) for receiving control commands from the user and display operational information corresponding to the received control command The TSP may include a display for displaying operational information and control commands the user is able to enter, a touch panel for detecting coordinates that comes in contact with a body part of the user, and a touch screen controller for determining a control command entered by the user based on the coordinates of contact detected by the touch panel. The touch screen controller may recognize the control command entered by the user by comparing the coordinates touched by the user detected by the touch panel and the coordinates of the control command displayed through the display.

The controller 410 may obtain a point corresponding to a predetermined distance ahead, above or vertically upward from a rear end of the driver's seat to be a reference point H by using information about an extent of shift of the driver's seat, as shown in FIG. 4.

Once the reference point H is obtained, the controller 410 may use the reference point H and joint information of the driver obtained by the operation recognizer 400 to calculate shoulder height A corresponding to a length from the reference point H to a shoulder point, upper-arm length B corresponding to a length from the shoulder point to an elbow point, lower-arm length C corresponding to a length from the elbow point to a wrist point, and hand length D corresponding to a length from the wrist point to a point of a fingertip. Alternatively, the same data may be calculated using standard, or approximated, physical data for the height of the user, which is stored in a memory 420 in advance.

The controller 410 may calculate a sphere centered on the shoulder point by adding the upper arm length, the lower arm length and the hand length, and determine an area on the display 300 that overlaps the sphere to be the operable area. Alternatively, the controller 410 may calculate a sphere centered on the shoulder point of the driver by adding an extra length, e.g., about 100 mm, determined by taking into account the driver's manipulating action while stretching his/her arm out, to the sum of the upper arm length, the lower arm length and the hand length, and determine an area on the display 300 that overlaps the sphere to be the operable area.

The controller 410 may determine the operable area using the driver's physical information obtained by the operation recognizer 400 as described above, or may determine the operable area to be an area of a predetermined size including a touched point P if the driver touches the point P on the display 300, as shown in FIG. 5. Prior to displaying a keypad, the controller 410 may display a message on the display 300 asking the driver to touch the display 300, thereby prompting the driver to touch the display 300.

After the message asking the driver to touch the display 300 is displayed, if the display 300 is touched as shown in FIG. 5, the operable area including the touched point may be determined. Otherwise, if the display has not been touched for a predetermined period of time, the operable area may be determined using the physical information as described above.

Alternatively, the controller 410 may determine the operable area for the driver to make touch gestures more easily by combining the driver's physical information and information about the touched point on the display 300.

After determining the operable area, the controller 410 may display a keypad of a predetermined form in the operable area R, as shown in FIG. 6. The arrangement of the keypad shown in FIG. 6 is only by way of example, and many different designs and arrangements of the keypad may be stored in advance in the memory 420 and among them, a design or arrangement suitable to the size and shape of the operable area may be selected for the keypad.

Taking into account an occasion when not the driver but a passenger may make a touch gesture on the display 300, the controller 410 may determine the operable area of a size and shape corresponding to the size and shape of an operable area determined for the driver in an area of the display 300 near the passenger, as shown in FIG. 7.

Alternatively, as described above, the passenger's physical information may be obtained and used in determining the operable area on the display 300, or the operable area may be determined to include a point on the display 300 touched by the passenger.

As described above, displaying an interface such as the keypad to receive a touch command not in a predetermined fixed area on the display 300, but in a dynamic area by taking into account the driver's physical condition, may allow the driver or the passenger to easily enter a touch command without a need for the driver or the passenger to move too much or to stretch his/her arm too much.

Figure 8:
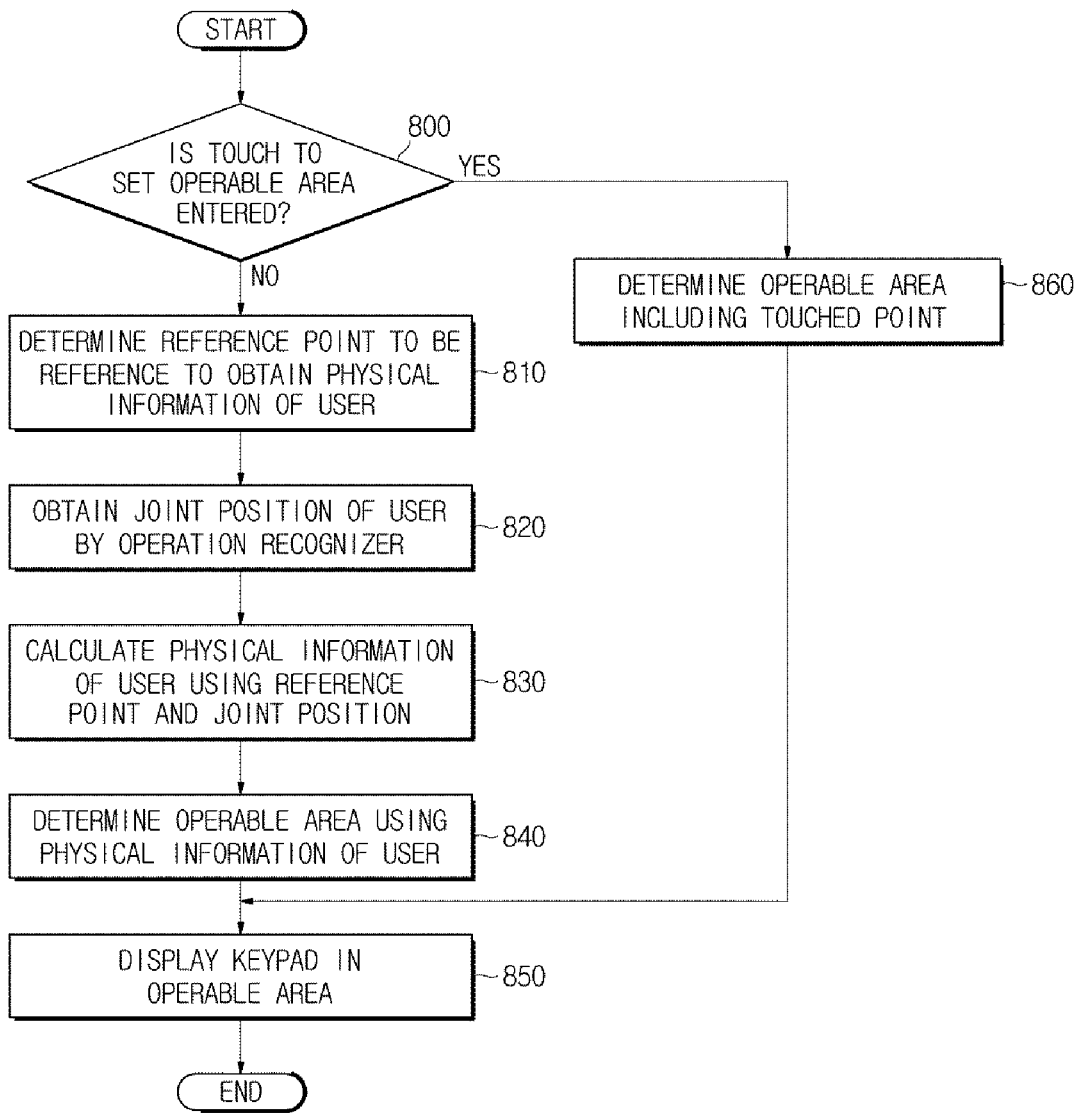
FIG. 8 is a flowchart illustrating a method for controlling a vehicle, according to exemplary embodiments of the present disclosure.

FIG. 8 is a flowchart illustrating a method for controlling a vehicle, according to exemplary embodiments of the present disclosure.

Referring to FIG. 8, the controller 410 determines whether a touch gesture has been entered to set an operable area in 800, and determines a reference point as a reference to obtain the user's physical information in 810 if the touch gesture has not been entered, and the operation recognizer 400 obtains information about joint positions of the user in 820. The controller 410 calculates the user's physical information using the reference point and the information about joint positions in 830, and determines an operable area using the calculated physical information in 840.

If no touch command to set an operable area on the display 300 has been entered, the controller 410 obtains a point corresponding to a predetermined distance ahead or upward from a rear end of the driver's seat to be a reference point H by using information about an extent of a shift of the driver's seat, as shown in FIG. 4.

The operation recognizer 400 obtains physical information required to determine an operable area from an image of the driver captured by a camera, as shown in FIG. 4. Specifically, the operation recognizer 400 may obtain information about points corresponding to the driver's shoulders, elbow, wrists and/or fingertips. The controller 410 uses the reference point H and joint information of the driver obtained by the operation recognizer 400 to calculate shoulder height A corresponding to a length from the reference point H to a shoulder point, upper-arm length B corresponding to a length from the shoulder point to an elbow point, lower-arm length C corresponding to a length from the elbow point to a wrist point, and hand length D corresponding to a length from the wrist point to a point of a fingertip. Alternatively, the same data may be calculated using standard physical data for the height of the user, which is stored in the memory 420 in advance. The controller 410 may calculate a sphere centered on the shoulder point of the driver by adding the upper arm length, the lower arm length, and the hand length, and determine an area on the display 300 that overlaps the sphere to be the operable area. Alternatively, the controller 410 may calculate a sphere centered on the shoulder point of the driver by adding an extra length, e.g., about 100 mm, determined by taking into account the driver's manipulating action while stretching his/her arm out, to the sum of the upper arm length, the lower arm length and the hand length, and determine an area on the display 300 that overlaps the sphere to be the operable area.

Once the operable area is determined, the controller 410 displays a keypad on the operable area, in 850.

In other words, after determining the operable area, the controller 410 may display a keypad of a predetermined form in the operable area R. Taking into account an occasion when a passenger may make a touch gesture on the display 300, the controller 410 may determine the operable area of a size and shape corresponding to the size and shape of an operable area determined for the driver in an area of the display 300 near the passenger, as shown in FIG. 7.

If the touch command to set an operable area on the display 300 is entered, the controller 410 determines an operable area including a touched point in 860, and displays a keypad in the determined operable area in 850.

The controller 410 may determine the operable area using the driver's physical information obtained by the operation recognizer 400 as described above, or may determine the operable area to be an area of a predetermined size including a touched point P if the driver touches the point P on the display 300, as shown in FIG. 5. After determining the operable area, the controller 410 may display a keypad of a predetermined form in the operable area R, as shown in FIG. 6.

According to embodiments of the present disclosure, the disclosed system and methods enable a customized and optimized user input technology that aids in driver comfort, functionality and safety.

Although the present disclosure is described with reference to some embodiments as described above and accompanying drawings, it will be apparent to those ordinary skilled in the art that various modifications and changes can be made to the embodiments. For example, the aforementioned method may be performed in different order, and/or the aforementioned systems, structures, devices, circuits, etc., may be combined in different combinations from what is described above, and/or replaced or substituted by other components or equivalents thereof, to obtain appropriate results.

Therefore, other implementations, other embodiments, and equivalents thereof may fall within the following claims.

What is claimed is:

1. A vehicle comprising:
 a display for displaying a keypad to receive a command through a touch gesture of a user; and
 a controller for determining an operable area for the user on the display, and for controlling the display to display the keypad in the operable area,
 wherein the controller is configured to calculate a reference point based on information about an extent of shift of a seat of the vehicle, and to calculate physical information of the user based on the reference point and the user's shoulder height and arm length, and
 the controller is configured to control the display to display a message asking the user to touch the display to display the keypad before the keypad is displayed, to determine the operable area including a touched point if the user touches the display within a predetermined period of time after the message has been displayed, and to determine the operable area based on the physical information of the user if the display is not touched for the predetermined period of time after the message has been displayed.

2. The vehicle of claim 1, further comprising:
 a camera, and
 an image processor for recognizing at least one joint position of the user using an image of the user captured by the camera.

3. The vehicle of claim 2, wherein the controller is configured to calculate the physical information using the reference point and the at least one joint position, of the user obtained by the image processor including the user's shoulder height and a user's upper-arm length, lower-arm length, and hand length.

4. The vehicle of claim 3, wherein the controller is configured to determine a sphere having a radius centered on the user's shoulder, the radius corresponding to a sum of the user's upper-arm length, lower-arm length, and hand length, and to determine the operable area based on an overlapping area between the sphere and the display.

5. The vehicle of claim 1, wherein the controller is configured to determine the operable area for the user on the display based on the extent of shift of the seat of the vehicle, and to control the display to display the keypad in the determined operable area.

6. A vehicle comprising:
 a display in the vehicle for displaying a keypad to receive a command through a touch gesture of a user; and a controller for calculating an operable area for the user on the display, and for controlling the display to display the keypad in the operable area, wherein the controller is configured to calculate physical information of the user based on the user's shoulder height and arm length, and the controller is configured to control the display to display a message asking the user to touch the display to display the keypad before the keypad is displayed, to determine the operable area including a touched point if the user touches the display within a predetermined period of time after the message has been displayed, and to determine the operable area based on the physical information of the user if the display is not touched for the predetermined period of time after the message has been displayed.

7. The vehicle of claim 6, further comprising:
a camera, and
an image processor for recognizing at least one joint position of the user using an image of the user captured by the camera.

8. The vehicle of claim 7, wherein the controller is configured to calculate a reference point to be a reference to obtain physical information of the user based on information about an extent of a shift of a seat of the vehicle, and calculate the physical information using the reference point and the at least one joint position of the user obtained by the image processor including the user's shoulder height, and a user's upper-arm length, lower-arm length, and hand length.

9. The vehicle of claim 8, wherein the controller is configured to determine a sphere having a radius centered on the user's shoulder, the radius corresponding to a sum of the user's upper-arm length, lower-arm length, and hand length, and to calculate the operable area based on an overlapping area between the sphere and the display.

10. The vehicle of claim 6, wherein the controller is configured to determine the operable area for the user on the display based on an extent of shift of a seat of the vehicle, and to control the display to display the keypad in the determined operable area.

11. A method for controlling a vehicle using a controller, the method comprising:

calculating a reference point for a user based on information about an extent of shift of a seat of the vehicle;

calculating physical information using the reference point and the user's shoulder height and arm length;

displaying a message on a display of the vehicle asking the user to touch the display to display a keypad;

determining an operable area for the user on the display of the vehicle based on the physical information if the display is not touched for a predetermined period of time after the message has been displayed;

determining the operable area to include a touched point if the user touches the display within the predetermined period of time after the message has been displayed; and displaying the keypad for receiving a command through a touch gesture of the user in the operable area on the display.

12. The method of claim 11, further comprising:
calculating the physical information using the reference point and at least one joint position of the user obtained by an image processor of the vehicle, including the user's shoulder height, and a user's upper-arm length, lower-arm length and hand length.

13. The method of claim 11, wherein determining an operable area for a user on a display of the vehicle based on the user's shoulder height and arm length comprises:

determining a sphere having a radius centered on the user's shoulder, the radius corresponding to a sum of the user's upper-arm length, lower-arm length and hand length, and determining the operable area based on an overlapping area between the sphere and the display.

14. The method of claim 11, wherein the displaying comprises displaying the keypad in the operable area determined based on the extent of shift of the seat of the vehicle.

* * * * *